United States Patent

Huang

(10) Patent No.: US 6,941,431 B2
(45) Date of Patent: Sep. 6, 2005

(54) METHOD FOR SECURING STORED DATA FROM ACCESS BY UNSPECIFIED COMPUTER

(75) Inventor: Hui-Chieh Huang, Taipei (TW)

(73) Assignee: Via Technologies, Inc. (TW)

( * ) Notice: Subject to any disclaimer, the term of this patent is extended or adjusted under 35 U.S.C. 154(b) by 349 days.

(21) Appl. No.: 10/121,560

(22) Filed: Apr. 12, 2002

(65) Prior Publication Data

US 2003/0126390 A1 Jul. 3, 2003

(30) Foreign Application Priority Data

Dec. 28, 2001 (TW) .................................. 90132677 A

(51) Int. Cl.[7] .............................................. G06F 12/00
(52) U.S. Cl. .................... 711/163; 711/112; 711/165; 713/165; 713/190; 713/195
(58) Field of Search ................... 711/112, 163, 711/165; 713/165, 190, 195

(56) References Cited

U.S. PATENT DOCUMENTS 5,968,147 A * 10/1999 Polfer et al. .................. 710/52
6,804,763 B1 * 10/2004 Stockdale et al. ........... 711/170
2001/0021983 A1 * 9/2001 Ono et al. ..................... 714/8
2003/0073497 A1 * 4/2003 Nelson ........................ 463/42
2004/0093306 A1 * 5/2004 Benoit ......................... 705/41

* cited by examiner

*Primary Examiner*—Donald Sparks
*Assistant Examiner*—Ngoc Dinh
(74) *Attorney, Agent, or Firm*—Madson & Metcalf

(57) ABSTRACT

A method for securing stored data for use in a computer is disclosed. The method includes the steps of providing a data to be stored in data storage device, addressing a data-storing request to the data storage device, wherein the data-storing request includes a first storing position data, proceeding an operation on the first storing position data to obtain a second storing position data, and writing the data into the data storage device according to the second storing position data. The operation for changing the first storing position data to the second storing position data is performed by a driver corresponding to the data storage device.

17 Claims, 5 Drawing Sheets

| # | |
|---|---|
| 0 | Reserved for IFS Manager |
| 1 | |
| 2 | Installable File System |
| 3 | FSD extension (e.g., DBLSPACE) |
| 4 | FSD extension (e.g., encryption) |
| 5 | Post volume-tracking value-added driver |
| 6 | Class driver |
| 7 | Type-specific driver |
| 8 | Vendor enhancement layer 1 |
| 9 | Vendor enhancement layer 2 |
| 10 | Vendor enhancement layer 3 |
| 11 | SCSI'izer |
| 12 | Vendor enhancement layer 4 |
| 13 | Vendor enhancement layer 5 |
| 14 | Vendor enhancement layer 6 |
| 15 | Vendor enhancement layer 7 |
| 16 | Vendor enhancement layer 8 |
| 17 | Vendor enhancement layer 9 |
| 18 | |
| 19 | Miscellaneous port driver |
| 20 | Windows NT-style miniport driver |
| 21 | Windows NT-style hardware-independent driver |
| 22 | ESDI port driver |
| 23 | ESDI emulator port driver |
| 24 | |
| 25 | ABIOS port driver |
| 26 | ABIOS pre-empting port driver |
| 27 | NEC floppy driver |
| 28 | |
| 29 | Socket service driver |
| 30 | Socket driver |
| 31 | Reserved for IOS registry |

Fig.3
Prior Art

METHOD FOR SECURING STORED DATA FROM ACCESS BY UNSPECIFIED COMPUTER

FIELD OF THE INVENTION

The present invention relates to a method for securing stored data, and more particularly to a method for securing stored data for use in a data access operation between a computer and a data storage device.

BACKGROUND OF THE INVENTION

Along with fast development of information industry, a lot of knowledge and information have been digitalized and stored as digital data. For example, a variety of visible and invisible business information is converted into various digital data files. All the business information, though converted as accessible digital data files, should be the private property only belonging to the company. Some of the files are even considered as secretes of the company. Therefore, the access of those digital data files has to be properly controlled. For confidential purpose, every company does his best to prevent those digital data files from divulgement. Therefore, it is a more and more important issue to secure the digital data files against arbitrary access, especially in the era of knowledge economy.

When considering this issue, a hard disk drive is a big leak for the digital data security. FIG. 1 is a schematic block diagram illustrating the typical data access in a computer. An operation system 10 sends out a read/write request that is processed by a driver 11, e.g. an integrated drive electronics (IDE) driver, to access data stored in a hard disk drive 12. The only requirement to access the hard disk drive 12 is to find a corresponding driver 11. Therefore, it is easy for anyone to read out the data stored in the hard disk drive by using a personal computer including the corresponding driver. Especially, for a removable hard disk drive that is originally designed to easily share data or make a redundant copy, the data access is even easier by connecting the removable hard disk drive to any personal computer including the corresponding driver. Therefore, the stealing or misusing problems of the data stored in the removable hard disk drive is more serious.

Therefore, the purpose of the present invention is to develop a method for securing stored data in a hard disk drive to deal with the above situations encountered in the prior art.

SUMMARY OF THE INVENTION

An object of the present invention is to provide a simple and efficient method for securing the stored data for use in a computer for preventing the data stored in a data storage device from divulgement or misusing.

According to an aspect of the present invention, there is provided a method for securing stored data for use in a computer. The method includes the steps of providing a data to be stored in a data storage device, addressing a data-storing request to the data storage device, wherein the data-storing request includes a first storing position data, proceeding an operation on the first storing position data to obtain a second storing position data, and writing the data into the data storage device according to the second storing position data.

Preferably, the method further includes the steps of addressing a data-reading request to the data storage device, wherein the data-reading request includes the first storing position data, proceeding the operation on the first storing position data to obtain the second storing position data, and reading out the data from the data storage device according to the second storing position.

Preferably, the data-storing and data-reading requests are addressed by an operation system of the computer. The operation on the first storing position data is preferably performed by a driver corresponding to the data storage device. The data is preferably written in/read out of the data storage device under the control of the driver.

For example, the data storage device can be an integrated drive electronics (IDE) hard disk.

For example, the data can be a digital data file.

Preferably, the first storing position data is pre-stored in a file allocation table (FAT).

Preferably, the operation is performed by shifting the first storing position data by a preset value. The preset value is preferably determined when the computer is installed therein a driver corresponding to the data storage device.

For example, the data storage device can be a rewritable and nonvolatile memory, a compact disc-rewritable memory (CD-RW), a compact disc-recordable memory (CD-R), or a floppy disk drive.

According to another aspect of the present invention, there is provided a method for securing stored data for use in a computer. The method includes the steps of installing a driver corresponding to a data storage device to the computer, wherein the driver includes a position change parameter, realizing a first storing position data from a preset look-up table corresponding to the data storage device in response to a data-accessing request, operating the first storing position data with the position change parameter to realize a second storing position data, and accessing data to the data storage device according to the second storing position data.

According to a further aspect of the present invention, there is provided a method for securing stored data for use in a data access operation between a computer and a data storage device, comprising a step of dislocating a first data read/write position in the data storage device, which is requested by an operation system of the computer, to a second data read/write position, which is determined by a driver installed in the computer and corresponding to the data storage device.

Preferably, the data read/write position is determined by shifting the first data read/write position by a preset value recorded in the driver.

BRIEF DESCRIPTION OF THE DRAWINGS

The present invention may best be understood through the following description with reference to the accompanying drawings, in which:

FIG. 3 is a table for defining layers of the input/output supervisor layer driver, which is stipulated by Microsoft® and cooperates with the operation system thereof.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
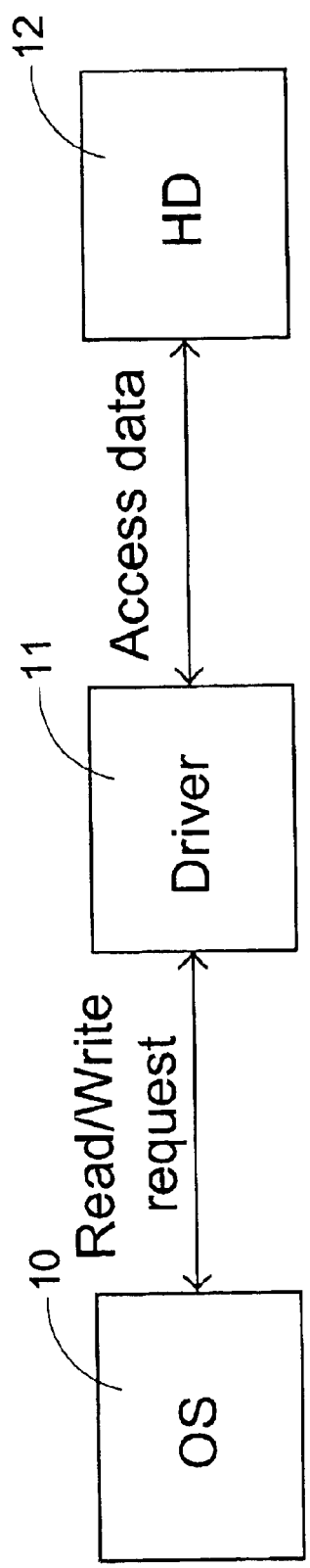
FIG. 1 is a schematic functional block diagram illustrating the typical data access in a computer.
Figure 2A:
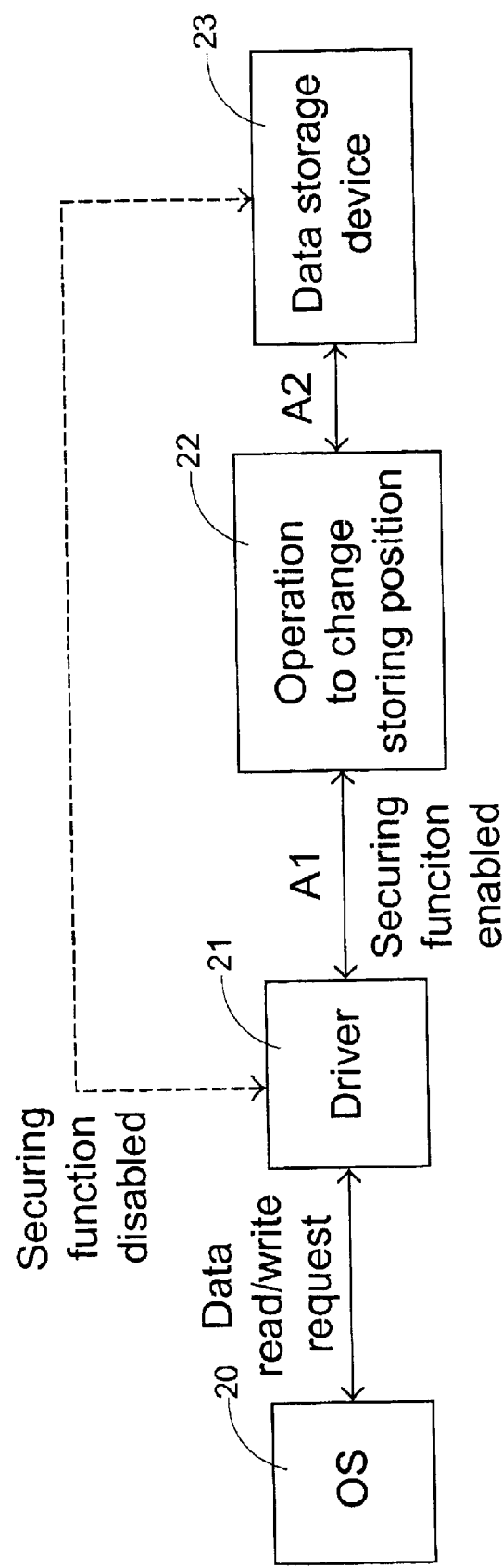
FIG. 2A is a schematic functional block diagram illustrating a preferred embodiment of a security method for data access according to the present invention.

Please refer to FIG. 2A which is a schematic functional block diagram illustrating a preferred embodiment of a method for securing data access according to the present invention. When a driver 21 corresponding to the data storage device 23 is installed, it is decided whether the securing function according to the present invention is enabled. For example, the driver with the securing function is different from the driver without the securing function, or the user may input a command to determine whether the securing function is enabled. If the securing function is not to be enabled, the operation system 20 will access data in a manner similar to that shown in FIG. 1 and described above. In other words, the storing position data indexing to the data storage device 23 under the control of the driver 21 is identical to that included in the data read/write request. On the other hand, once the securing function is enabled, the driver 21 will proceed an operation 22 on a first storing position data A1, which is included in the data read/write request, to obtain a second position data A2 in response to the read/write request. Then, the driver 21 reads out/writes in data to the data storage device 23 according to the second position data rather than the first position data.

Figure 2B:
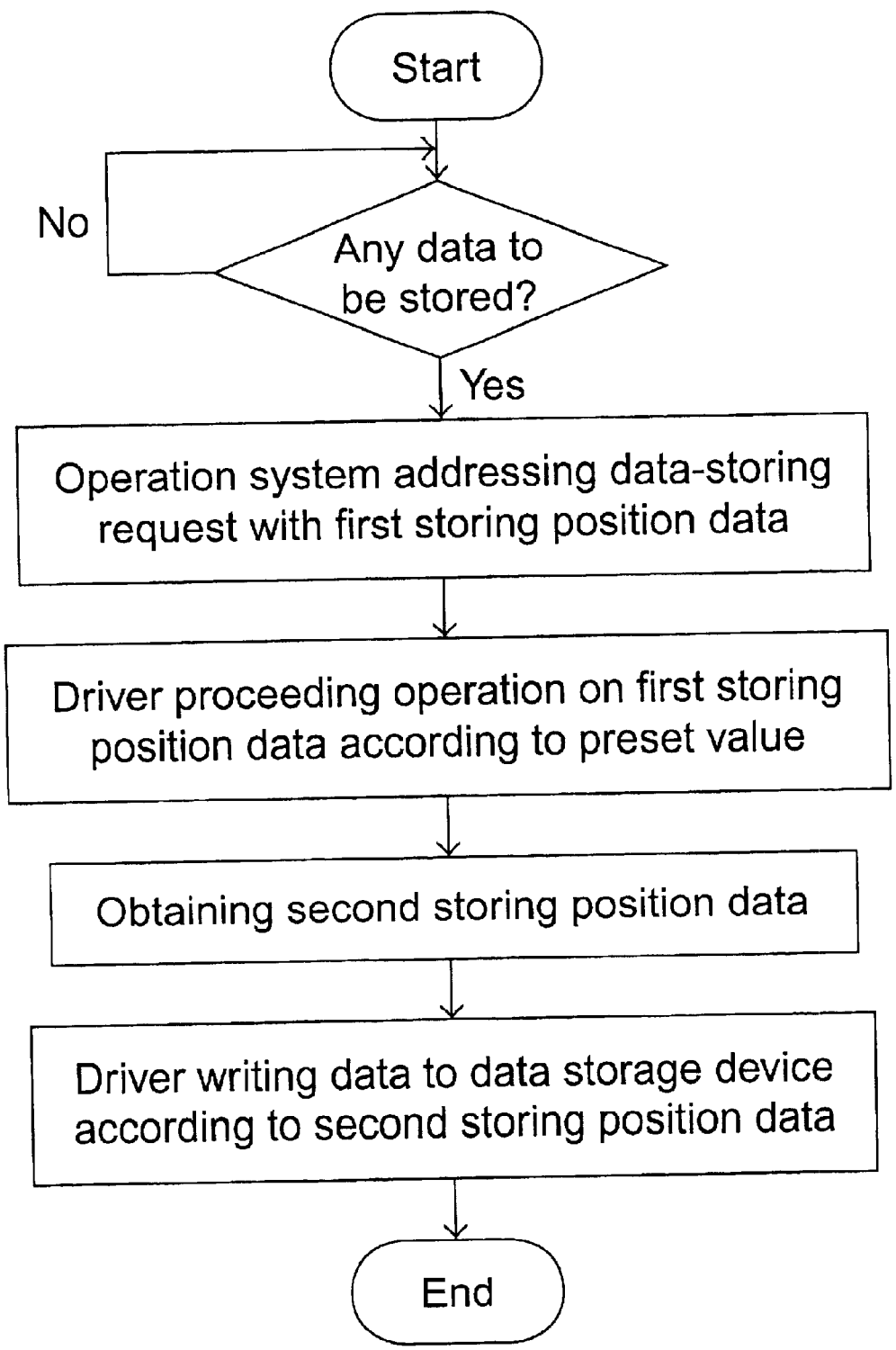
FIG. 2B is a flow chart illustrating a preferred embodiment of a security method for storing data according to the present invention.

For the easy understanding of the present invention, an example is given herein with reference to the flowchart of FIG. 2B to describe the present invention in details. First of all, a driver according to the present invention is installed to interface between a computer and a data storage device, e.g. an integrated drive electronics (IDE) hard disk drive. During installing, the driver permits the user to input a preset value for securing purpose and allows the preset value to be stored. Once data, such as a digital data file, needs to be stored in the IDE hard disk drive, the operation system of the computer addresses a writing request to the IDE hard disk drive. The writing request includes a first position data, i.e. an original position data realized by the operation system and recorded in a file allocation table (FAT). Subsequently, the driver proceeds an operation to change the first position data to the second position data in response to the writing request. The operation for changing the position data can be achieved by using the preset value to proceed a particular calculation. For example, the first position data is shifted the preset value to the second position data. Then, according to the second position data, the driver stores the data into the data storage device.

Figure 2C:
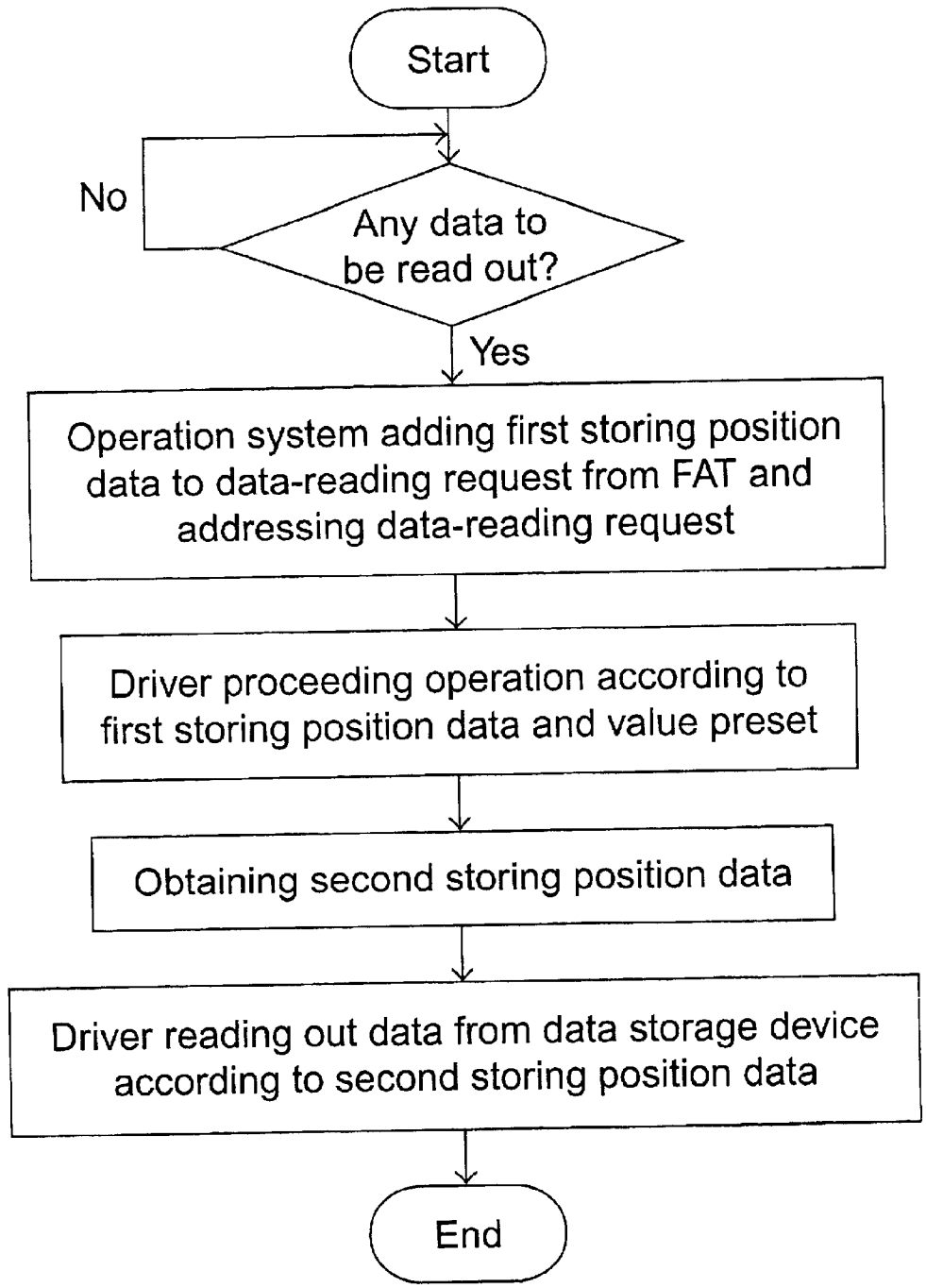
FIG. 2C is a flow chart illustrating a preferred embodiment of a security method for reading out data according to the present invention.

On the other hand, when the data stored in the data storage device would like to be read out by the operation system of the computer, the procedure is briefly shown in FIG. 2C. At first, when the operation system addresses a reading request to the IDE hard disk drive, the first position data is drawn out from the FAT and put into the reading request. Subsequently, the driver proceeds the operation on the first position data to obtain the second position data according to the preset value. Thus, the required data is read out from the data storage device according to the second position data.

As having been mentioned above, the user may decide if the data file is secured or not. If it is, the data file will be stored by the above method according to the present invention. Otherwise, the data file can be stored in the prior art way. Generally, the securing function is enabled for confidential data, and the securing function can be disabled for common data.

The security method of the present invention is especially useful for the data security for a personal computer. As known, the hard disk of a personal computer, especially the removable one, is subject to access by unspecified persons. By using the present security method, the data file in the hard disk drive won't be correctly read out unless a if corresponding driver with the correct preset value is installed. It is to be noted that the operation to change the first storing position to the second storing position is simply performed by equal-amount shift. Other complicated operations may be performed to achieve the same purpose.

In order to reduce the possibility of interception or revision by others, it is preferred that the present security method be implemented in a layer as close to the hardware end as possible. A table for defining layers of the input/output supervisor layer driver is given as an example with reference to FIG. 3. The table is stipulated by Microsoft® and cooperates with Microsoft® operation system. Along with the increase of the numbers given to the layers, a closer relationship to the hardware is indicated. For example, the $21^{st}$ layer of "windows NT-style hardware-independent driver" is closer to the hardware than the $17^{th}$ layer of "vendor enhancement layer 9". Certainly, the security method according to the present invention can be applied to any layer in the table. In an embodiment, the present invention is applied to the $21^{st}$ layer of an IDE miniport driver.

The present invention can be used for securing data of a variety of data storage devices. In addition to the hard disk drive mentioned above, the data storage device of the present invention, for example, can be a rewritable and nonvolatile memory, a compact disc-rewritable memory (CD-RW), a compact disc-recordable memory or a floppy disk drive.

To sum up, the method for securing stored data according to the present invention can simply and efficiently prevent the confidential data of the data storage device from divulgement or misusing.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for securing data stored in a data storage device of a computer, said method comprising the steps of:

addressing a data-storing request to said data storage device, wherein said data-storing request includes a first storing position data;

performing an arithmetic operation on said first storing position data with a position change parameter to obtain a second storing position data; and writing said data into said data storage device according to said second storing position data.

2. The method according to claim 1 further comprising the steps of:

addressing a data-reading request to said data storage device, wherein said data-reading request includes said first storing position data;

proceeding said arithmetic operation on said first storing position data to obtain said second storing position data; and reading out said data from said data storage device according to said second storing position data.

3. The method according to claim 2 wherein said data-storing and data-reading requests are addressed by an operation system of said computer.

4. The method according to claim 3 wherein said operation on said first storing position data is performed by a driver corresponding to said data storage device.

5. The method according to claim 4 wherein said data is written in/read out of said data storage device under the control of said driver.

6. The method according to claim 1 wherein said data storage device is an integrated drive electronics (IDE) hard disk.

7. The method according to claim 1 wherein said data is a digital data file.

8. The method according to claim 1 wherein said first storing position data is pre-stored in a file allocation table (FAT).

9. The method according to claim 1 wherein said operation is performed by shifting said first storing position data by a preset value.

10. The method according to claim 9 wherein said preset value is determined when said computer is installed therein a driver corresponding to said data storage device.

11. The method according to claim 1 wherein said data storage device is a rewritable and nonvolatile memory.

12. The method according to claim 1 wherein said data storage device is a compact disc-rewritable memory (CD-RW).

13. The method according to claim 1 wherein said data storage device is a compact disc-recordable memory (CD-R).

14. The method according to claim 1 wherein said data storage device is a floppy disk drive.

15. A method for securing stored data for use in a computer, said method comprising the steps of:

installing a driver corresponding to a data storage device to said computer, wherein said driver includes a position change parameter;

realizing a first storing position data from a preset look-up table corresponding to said data storage device in response to a data-accessing request;

operating said first storing position data with said position change parameter to realize a second storing position data;

accessing data to said data storage device according to said second storing position data.

16. A method for securing stored data for use in a data access operation between a computer and a data storage device, comprising a step of dislocating a first data read/write position in said data storage device, which is requested by an operation system of said computer, to a second data read/write position, which is determined by a driver installed in said computer and corresponding to said data storage device, wherein said second data read/write position arithmetically correlates to said first data read/write position.

17. The method according to claim 16 wherein said second data read/write position is determined by shifting said first data read/write position by a preset value recorded in said driver.

* * * * *